June 3, 1947.  E. PELL  2,421,431
CONTROLLER FOR INDUCTION MOTORS
Filed Feb. 8, 1946  2 Sheets-Sheet 2
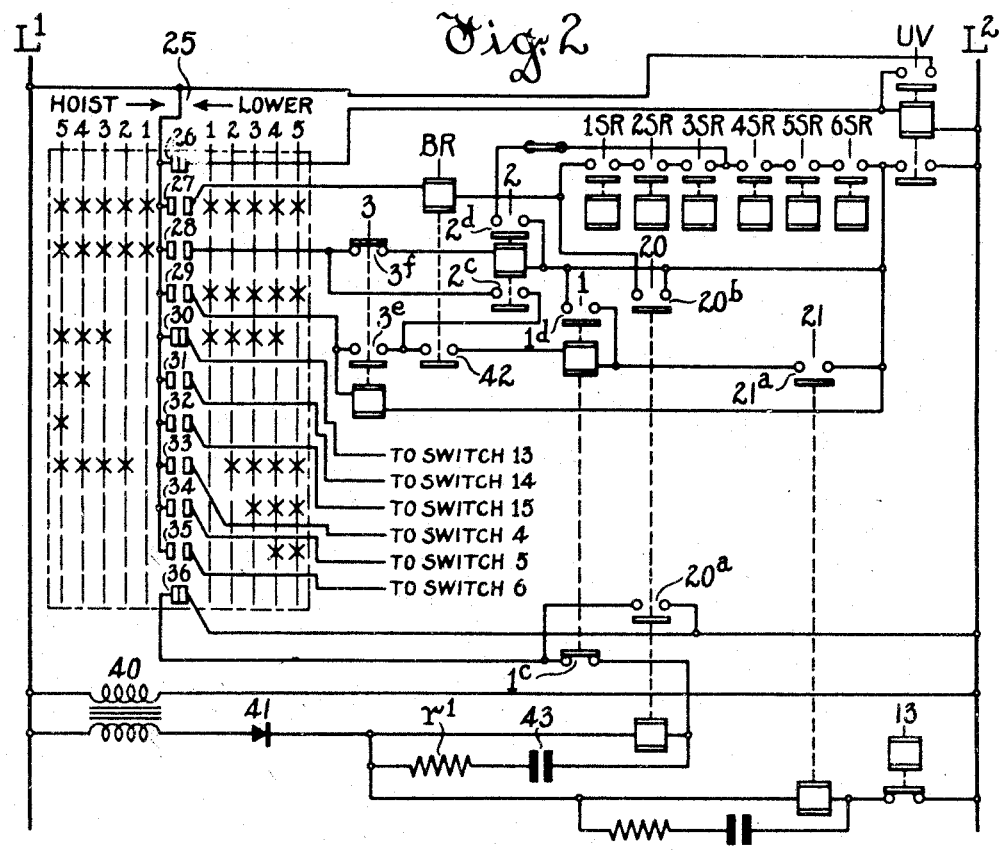
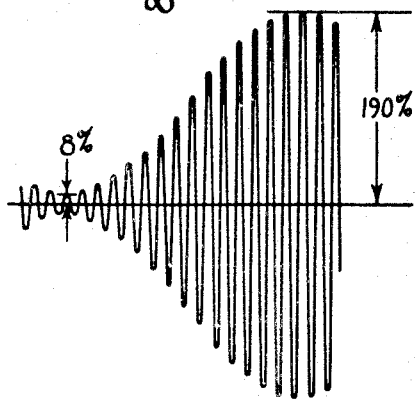
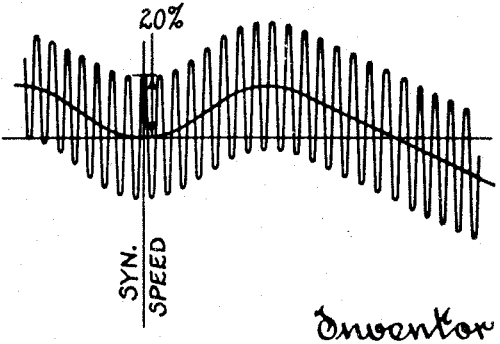
Inventor
Eric Pell
By Frank H. Willard
Attorney Patented June 3, 1947

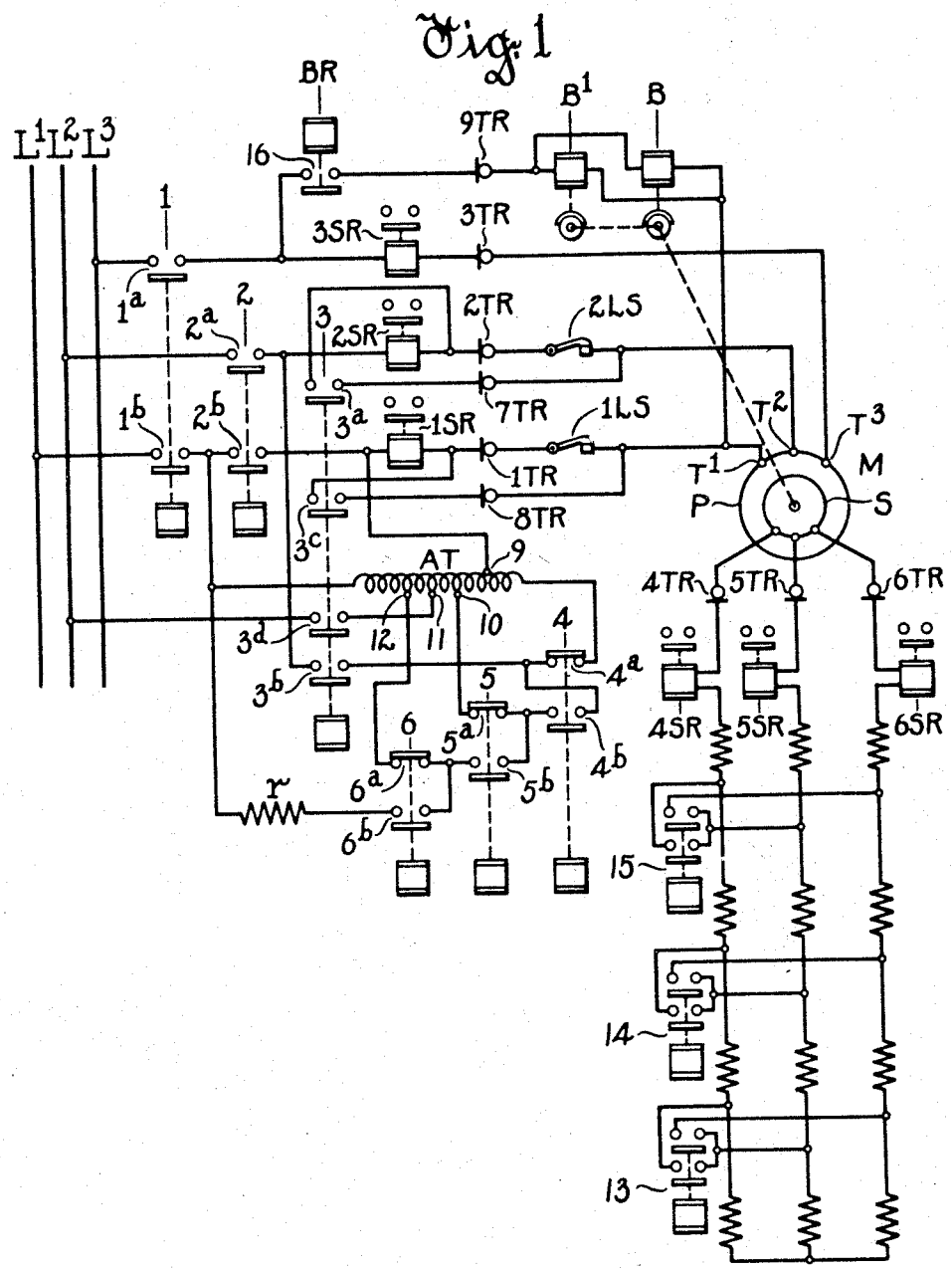

2,421,431

UNITED STATES PATENT OFFICE 2,421,431

CONTROLLER FOR INDUCTION MOTORS

Eric Pell, Shorewood, Wis., assignor to Cutler-Hammer, Inc., Milwaukee, Wis., a corporation of Delaware Application February 8, 1946, Serial No. 646,382

7 Claims. (Cl. 172—179)

This invention relates to controllers for induction motors requiring trolley connections including such connections for the motor secondary.

The invention has among its objects to afford such motor trolley failure protection inclusive of such protection for the motor secondary through the medium of series relays, and to provide such protection where the motor as in load lowering is operated at speeds below and above synchronous speed.

Other objects and advantages of the invention will hereinafter appear.

According to the present invention where the motor is employed in hoisting and lowering it is proposed to obtain in lowering the desired protection through a combination of series relays in the motor secondary circuit and voltage unbalance of the motor primary such that the series relays in the motor secondary circuit are not adversely affected by acceleration or deceleration of the motor to or through synchronous speed.

The accompanying drawing illustrates diagrammatically an embodiment of the invention which will now be described, it being understood that the embodiment illustrated is susceptible of various modifications without departing from the scope of the appended claims.

In the drawing:

Figure 1 is a diagrammatic view of the primary and secondary circuits of an induction motor which it will be assumed is employed for load hoisting and lowering, this view showing the control switches for said connections;

Fig. 2 is a diagrammatic view showing control means and circuits for certain of the control instrumentalities shown in Fig. 1, and Figs. 3 and 4 depict certain characteristics of the control.

Referring to Fig. 1, the same shows a motor M having a primary P and a secondary S, together with primary and secondary control which in general is of a well known form adapting the motor to load hoisting and lowering service. The primary control includes an autotransformer AT through the medium of which the motor primary is subjected to variable voltage unbalance in lowering, for different lowering speeds below and above synchronous speed. This autotransformer is excluded from circuit in hoisting. In conjunction with this control the motor is provided with series relays 1SR, 2SR and 3SR in the different phases of the primary circuit and series relays 4SR, 5SR and 6SR in the different phases of the secondary circuit. As will later appear, all of these series relays respond upon starting of the motor for hoisting or lowering assuming all trolley connections to be intact, whereas release of any one of said relays effects disconnection of the motor and application of its brakes.

Referring more specifically to the motor connections shown in Fig. 1, terminal T³ of the motor primary is connected through a trolley 3TR, the coil of series relay 3SR and contacts 1ᵃ of a main switch 1 to line L³. Primary terminal T² is connected through a limit stop 2LS, trolley 2TR, the coil of series relay 2SR and contacts 2ᵃ of a hoist switch 2 to line L². Primary terminal T¹ is connected through a limit stop 1LS, trolley 1TR, the coil of series relay 1SR, contacts 2ᵇ of hoist switch 2 and contacts 1ᵇ of main switch 1 to line L¹. These constitute the hoisting connections for the motor primary. The lowering connections for the motor primary include the aforementioned connections for terminal T³. In lowering terminal T² is connected through a trolley 7TR and contacts 3ᵃ of lowering switch 3 to and through the coil of series relay 2SR, contacts 3ᵇ of lowering switch 3 and contacts 4ᵃ of a switch 4 to the right hand end terminal of transformer AT, the contacts 4ᵃ being normally engaged. Motor terminal T¹ is connected through a trolley 8TR and contacts 3ᶜ of lowering switch 3 to and through the coil of series relay 1SR to a tap 9 of the transformer AT. The transformer in turn is connected in part across lines L¹ and L², said transformer having its left hand end terminal connected to line L¹ through contacts 1ᵇ of main switch 1, and having a tap 11 connected through contacts 3ᵈ of lowering switch 3 to line L². These connections provide for maximum voltage unbalance of the motor primary and a small motor torque in hoisting direction. Response of switch 4 disconnects motor terminal T² from the right hand terminal of transformer AT, and connects terminal T² through contacts 4ᵇ of switch 4 and normally closed contacts 5ᵃ of switch 5 to transformer tap 10. This effects variation of the voltage unbalance and reversal of the motor torque. Response of switch 5 disconnects terminal T² from transformer tap 10 and connects the same to transformer tap 12 through contacts 4ᵇ of switch 4, contacts 5ᵇ of switch 5 and normally closed contacts 6ᵃ of switch 6. Switch 6 in responding disconnects motor terminal T² from transformer tap 12 and through contacts 6ᵇ of switch 6 connects said motor terminal through a resistance r to and through contacts 1ᵇ of main switch 1 to line L¹.

The motor secondary connections include the usual banks of resistors, three banks of which are adapted to be excluded from circuit progressively by switches 13, 14 and 15. One phase of the secondary circuit includes the aforementioned series relay 4SR and trolley 4TR, while a second phase includes series relay 5SR and trolley 5TR, the third phase including series relays 6SR and trolley 6TR.

The motor brakes comprise releasing coils B and B¹ connected across motor terminals T¹ and T³ through a trolley 9TR and contacts 16 of a brake relay BR.

As will later appear, the contacts of all series relays are in series and release of any one of the relays during hoisting or lowering effects disconnection of the motor from the supply lines and also release of the brake relay to effect application of the motor brakes. Likewise release of the brake relay alone effects the same results so that the motor is duly protected upon failure of circuit through any trolley. On the other hand, the contacts of the series relays must be shunted for a transient period in starting and said relays must be responsive within such period, whereas they must be capable of holding in under widely varying current conditions to serve their intended purpose. Design and adjustment of the series relays for the motor primary circuit presents little difficulty but the problem presented by the series relays in the motor secondary circuit is a complex one. The latter relays during lowering are under the control of positive and negative sequence currents in the rotor resulting from voltage unbalance of the motor primary and are dependent upon the negative sequence current for hold in as the motor attains and passes through synchronous speed, whereas in starting said relays are subjected to a current wave representing the vectorial sum of the two sequence currents. While the minimum unbalance provided on the last speed point in lowering must be sufficient to insure relay hold in at synchronous speed, the maximum unbalance on the first speed point must be limited to a value which will provide sufficient current to pick up the relays should the position of the rotor be such that the sequence currents are in direct opposition in any one phase. The secondary current in any phase for maximum unbalance (first speed point) with the motor stalled preferably is substantially as indicated in Fig. 3 wherein it is plotted against angular position of the motor. The current wave shown represents the vectorial sum of the two sequence currents in the rotor, the minimum value being obtained with the currents completely out of phase, and the maximum value with the currents completely in phase. Depending upon the position of the rotor in relation to the stator the current in any phase may have a value between the minimum and maximum indicated. With a voltage unbalance which will produce 10% hoisting torque at standstill and with a total secondary resistance of 50% the minimum and maximum values of secondary current will be approximately 8% and 190%, respectively. This represents a spread of about 24 to 1 and the relays may be made to function satisfactorily if provided with saturable cores and liberal coil space.

The secondary current in any phase for minimum unbalance on the last speed point as the motor approaches synchronous speed preferably is as indicated in Fig. 4. The frequency and magnitude of the positive sequence current at synchronous speed will be zero as indicated, while the frequency of the negative sequence current will be double that of the line frequency. The unbalance obtainable on this speed point with two of the motor primary terminals connected to the line and with the third supplied from the overhanging transformer tap, will produce at synchronous speed of the motor a negative sequence double frequency current (120 cycles) of about 20% of the rated motor current with 100% secondary resistance which is sufficient to effect hold in of the series relays while the motor attains and passes through synchronous speed.

Secondary circuit relays heretofore designed for the system shown have functioned satisfactorily also in hoisting except under very light load conditions, and experimentation demonstrates possibility of designing the relays to function satisfactorily under all load conditions in hoisting. However, the need for trolley failure protection in hoisting is debatable and controllers are in use which provide for shunting the contacts of the secondary circuit series relays during hoisting.

Referring now to Fig. 2, the same shows control circuits for most of the switches shown in Fig. 1 and indicates the sequence of operation of all switches of Fig. 1 in hoisting and lowering. Fig. 2 shows the operating windings and auxiliary contacts of brake relay BR, main switch 1, hoist switch 2 and lowering switch 3 of Fig. 1. Additionally Fig. 2 shows an undervoltage relay UV, two timing relays 20 and 21, and a drum type master controller 25 for the various switches to be placed under manual control. Master controller 25 comprises sets of contacts 26, 27, 28, 29, 30, 31, 32, 33, 34, 35 and 36, all of which are disengaged in the off position of the master switch except contacts 26, 30 and 36 which are engaged in the off position. In hoisting and lowering the sets of contacts are disengaged except in those positions of the drum indicated by crosses in line with the individual sets of contacts, the contacts being closed in all drum positions indicated by their respective crosses. For example, contacts 26 are disengaged in all positions of the drum except off position, while contacts 27 are engaged in all positions of the drum except off position, and contacts 28 are engaged in all hoisting positions of the drum but not in any lowering position of the drum.

In off position of the drum contacts 26 connect the winding of relay UV across lines L¹ and L², and said relay in responding completes for itself a maintaining circuit through its contacts 37, the contacts 38 of relay UV being in circuit with the windings of relay BR and switches 1, 2 and 3. Also in off position drum contacts 30 engage to establish a connection whereby the winding of switch 13 is energized upon closure of the main switch and the lowering switch, such circuit being well known and thus omitted from the drawing. Also in the off position the drum through engagement of its contacts 36 completes energizing connections for the winding of timing relay 20. This relay is supplied with current by a transformer 40 through a rectifier 41, the circuit of said winding extending from line L¹ through a coil of said transformer, rectifier 41, down contacts 1ᶜ of main switch 1 and drum contacts 36 of the master switch to line L². Thus timing relay 20 is rendered responsive to close its contacts 20ᵃ and 20ᵇ while the motor is at rest. Contacts 20ᵃ establish for the relay 20 a maintaining circuit shunting the drum contacts 36, and this circuit maintains relay 20 energized until it is deenergized by later response of the main switch 1 to open contacts 1ᶜ, and said relay when energized acts through its contacts 20ᵇ to shunt all contacts of the series relays 1SR to 6SR.

Then assuming the drum to be moved to its first lowering position, its contacts 27 engage to complete circuit from line L¹ to and through the winding of brake relay BR to line L², through contacts 20ᵇ of the timing relay 20, and contacts 38 of the undervoltage relay UV. Also drum contacts 29 engage to complete circuit from line L¹ to and through the winding of lowering switch 3 to line L² through the contacts 38 of the undervoltage relay UV, and switch 3 in responding effects energization of main switch 1. The winding of main switch 1 is connected in parallel with the winding of switch 3 through the contacts 3ᵉ of switch 3, the contacts 42 of relay BR and contacts 21ᵃ of timing relay 21. This constitutes the first speed point in lowering with maximum voltage unbalance of the motor primary, the switch 13 being energized, as heretofore explained, by closure fo contacts of the main switch and lowering switch to short-circuit one bank of secondary resistors. While at the outset timing relay 20 short-circuits all contacts of the series relays, response of the main switch 1 disconnects from line L² the winding of relay 20, leaving it in a closed loop comprising a condenser 43 and a resistor $r^1$ whereby subject to the time element provided by this well known condenser loop said relay releases to reinsert in the circuit of the brake relay winding the contacts of the six series relays. Continued movement of the drum in lowering direction energizes progressively the switches 4, 5 and 6 to change the voltage unbalance of the motor primary, as heretofore explained, leaving unchanged the resistance in the motor secondary circuit until the master switch reaches its final position wherein it deenergizes switch 13 to reinsert the fourth bank of secondary resistors. As is customary, the operating winding of main switch 1 has in circuit therewith contacts 21ᵃ of timing relay 21, which contacts are paralleled by contacts 1ᵈ of switch 1, this timing relay and the interlocking function of its contacts 21ᵃ being so well known as to require no description.

Assuming movement of the drum from a lowering position to a hoisting position, this effects deenergization of main switch 1 among others, and at least momentary reengagement of drum contacts 36, thus effecting reenergization of the winding of relay 20 which through its contacts 20ᵃ maintains itself until main switch 1 again closes. In the first hoisting position the master switch effects energization of the brake relay BR in the manner hereinbefore described and also completes circuit from line L¹ through down contacts 3ᶠ of lowering switch 3 to and through the winding of hoist switch 2 through the contacts 38 of the undervoltage relay UV to line L². Switch 2 in responding functions through its contacts 2ᶜ to complete circuit from the now closed drum contacts 28 to and through contacts 42 of the brake relay, to and through the winding of main switch 1 to line L² as aforedescribed. This provides for starting the motor in hoisting direction with the contacts of all series relays temporarily shunted by the contacts 20ᵇ of timing relay 20. Also hoist switch 2 in responding functions through its contacts 2ᵈ to shunt the contacts of the secondary circuit series relays through a manual switch 45. This shunt renders the secondary circuit series relays ineffective during hoisting but if the protection of these relays is desired in hoisting it may be obtained by merely opening the manual switch 45. This optional shunt for the secondary circuit series relay contacts is especially advantageous where the relays will function satisfactorily in hoisting except under very light loads for then if a light load is exceptional the switch 45 may be normally left open to be closed only in the exceptional case.

As will be understood by those familiar with the type of control illustrated, certain commonly employed features have been omitted for simplicity of illustration. These omissions include overload relays commonly included in the primary circuit, phase interruption of the bank of resistors controlled by switch 13 thereby to provide for low torque slack cable take up, the plugging relay, the braking relay, etc. Also it will be understood that the desired voltage unbalancing of the motor primary may be effected in various ways other than by the autotransformer illustrated with probably satisfactory functioning of the trolley failure relays.

What I claim as new and desire to secure by Letters Patent is:

1. In combination, an induction motor, trolley connections for the secondary of said motor, a source of power, means to establish and interrupt connections between said source of power and the primary of said motor, series relays for the motor secondary circuit which function to effect through the medium of said means disconnection of the motor primary upon trolley failures, and means to effect voltage unbalance of the motor primary such as to render said series relays under normal trolley conditions stable during speed changes of said motor to or through synchronous speed.

2. In combination, an induction motor, trolley connections for the secondary of said motor, a source of power, means to establish and interrupt connections between said source of power and the primary of said motor, series relays for the motor secondary circuit which function to effect through the medium of said means disconnection of the motor primary upon trolley failures and means to effect voltage unbalance of the motor primary, to different degrees for speed control of said motor under certain operating conditions, the last mentioned means being restricted to voltage unbalancing such as to effect with said trolley connections completed, given settings of said relays upon starting of said motor, and to render said relays pending trolley failure stable during speed changes of said motor to or through synchronous speed.

3. In combination, an induction motor for hoisting and lowering, trolley connections for the secondary of said motor, means to establish and interrupt power connections for the motor primary, series relays for the motor secondary circuit capable of functioning to effect through the medium of said means disconnection of the motor primary upon trolley failures, said relays having saturable cores and liberal coil space such that when set upon motor starting they will remain so set during hoisting operation of said motor pending trolley failure, and means to effect for lowering operation of said motor voltage unbalance of its primary such that said relays set upon motor starting and pending trolley failure remain so set during changes in lowering speed of the motor to or through synchronous speed.

4. In combination, an induction motor, trolley connections for the secondary of said motor, an electrically controlled brake for said motor, a power supply source, means controlling connection of the motor primary to said source and controlling said brake for release thereof in motor starting and application thereof in motor stopping, series relays for the secondary circuit of said motor which are capable of effecting through the medium of said means disconnection of the motor primary and application of said brake upon trolley failures, and means to effect voltage unbalance of the motor primary such as to render said series relays pending trolley failure stable during speed changes of said motor to or through synchronous speed.

5. In combination, an induction motor, trolley connections for the secondary of said motor, an electrically controlled brake for said motor, a power supply source, means controlling connection of the motor primary to said source and controlling said brake for release thereof in motor starting and application thereof in motor stopping, series relays for the secondary circuit of said motor which are capable of effecting through the medium of said means disconnection of the motor primary and application of said brake upon trolley failures, and means to effect voltage unbalance of the motor primary such as to render said series relays pending trolley failure stable during speed changes of said motor to or through synchronous speed, the first mentioned means including means to shunt the contacts of said series relays for a predetermined transient period in starting and to require a manual operation for reestablishment of said shunt for restarting of said motor after stopping thereof by any of said relays.

6. In combination, an induction motor, trolley connections for the secondary of said motor, series relays for the secondary of said motor, an alternating current supply source, means to shunt the contacts of said relays and to connect the primary of said motor to said supply source, said means comprising a relay for control of said shunt, which relay has a capacitance loop for its winding and receives a supply of rectified current derived from said source but terminated by motor starting operation of said means thereby to interrupt said shunt subject to a time element and to place said means under the control of said series relays for stopping of said motor upon trolley failures, and means to effect voltage unbalance of the motor primary such as to render said series relays pending trolley failure stable during speed changes of said motor to or through synchronous speed.

7. In combination, an induction motor, trolley connections for its secondary, an alternating supply circuit, means including a master switch to establish and interrupt connections between the primary of said motor and said source, series relays for the secondary circuit of said motor which when deenergized as by trolley failure tend individually to effect disconnection of the motor primary by said means, a shunt for the contacts of said series relays completed by said means in starting said motor, said means comprising a timing relay having its winding in a capacitance loop and being subjected by said master switch when in off position to a supply of rectified current derived from said source, said relay when energized completing for itself a maintaining circuit and completing said series relay shunt but being deenergizable by motor starting operation of said means thereby to interrupt said series relay shunt subject to the time delay afforded it by its capacitance loop, and means to effect voltage unbalance of the motor primary with consequent production of positive and negative sequence currents utilized to effect setting of said series relays while their contacts are temporarily shunted and also utilized to maintain said series relays pending trolley failure stable during speed changes of said motor to or through synchronous speed.

ERIC PELL.